Jan. 5, 1932.  W. N. BOOTH  1,839,828
SEVERING MACHINE
Filed April 2, 1928   3 Sheets-Sheet 1

Inventor
William N. Booth
By Whittemore Hulbert Whittemore Belknap
Attorneys

Jan. 5, 1932.  W. N. BOOTH  1,839,828
SEVERING MACHINE
Filed April 2, 1928   3 Sheets-Sheet 2

Inventor
William N. Booth
By Whittemore, Hulbert Whittemore & Belknap
Attorneys

Jan. 5, 1932.  W. N. BOOTH  1,839,828
SEVERING MACHINE
Filed April 2, 1928   3 Sheets-Sheet 3
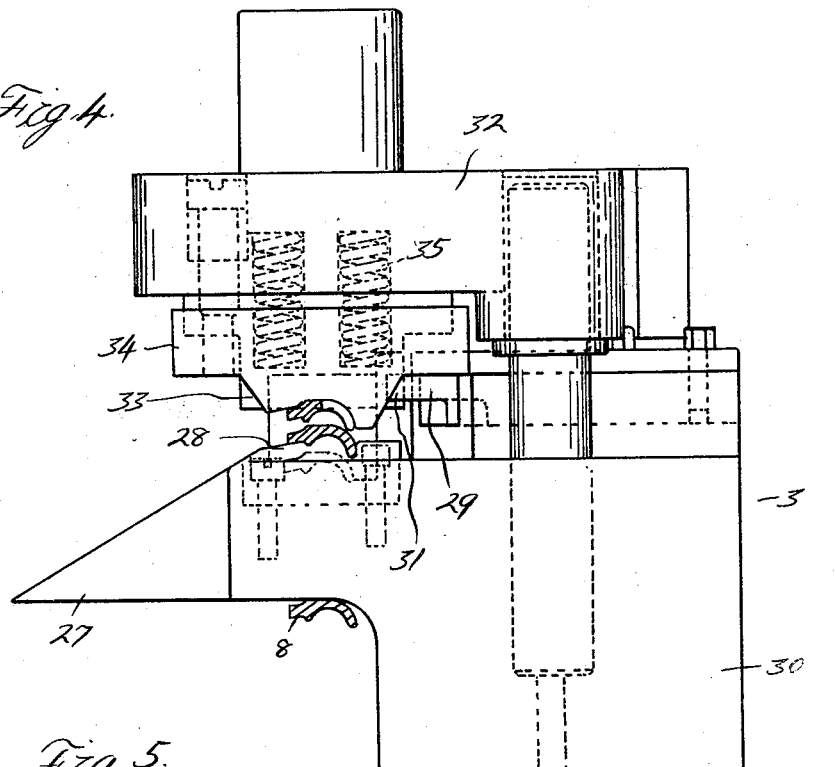
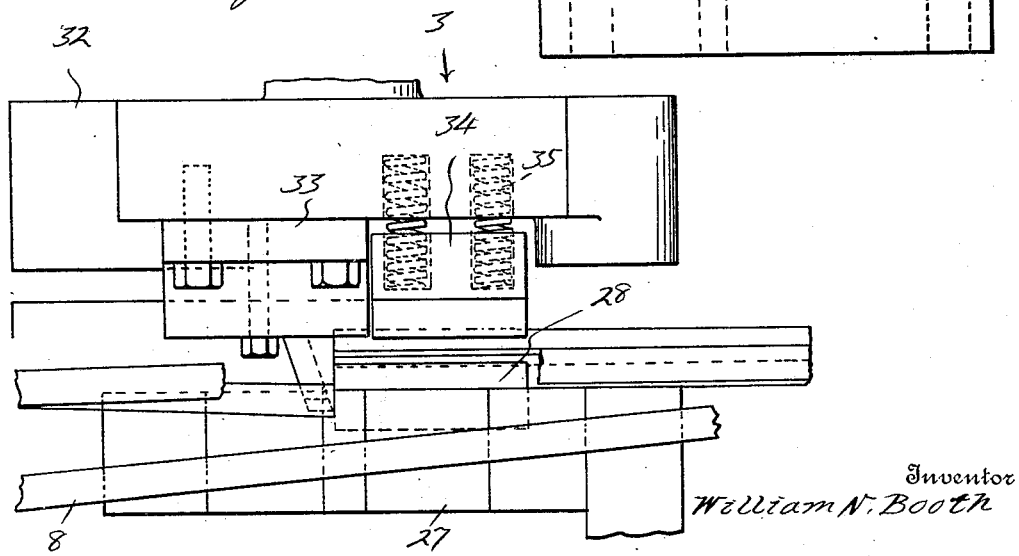
Inventor
William N. Booth
By Whittemore Hulbert Whittemore & Belknap
Attorneys Patented Jan. 5, 1932

1,839,828

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

SEVERING MACHINE

Application filed April 2, 1928. Serial No. 266,713.

The invention relates to severing machines and refers more particularly to severing machines designed for use in the manufacture of tire carrying rim members such as split side rings. One of the objects of the invention is to so construct the machine that it produces a tire carrying rim member such as a split side ring which is as nearly true as commercially practicable. Other objects of the invention reside in the novel features of construction and combinations and arrangements of parts as more fully hereinafter set forth.

In the drawings:—

Figure 1 is a plan view of a machine embodying my invention;

Figures 4 and 5 are respectively side and front elevations thereof;

Figure 2:
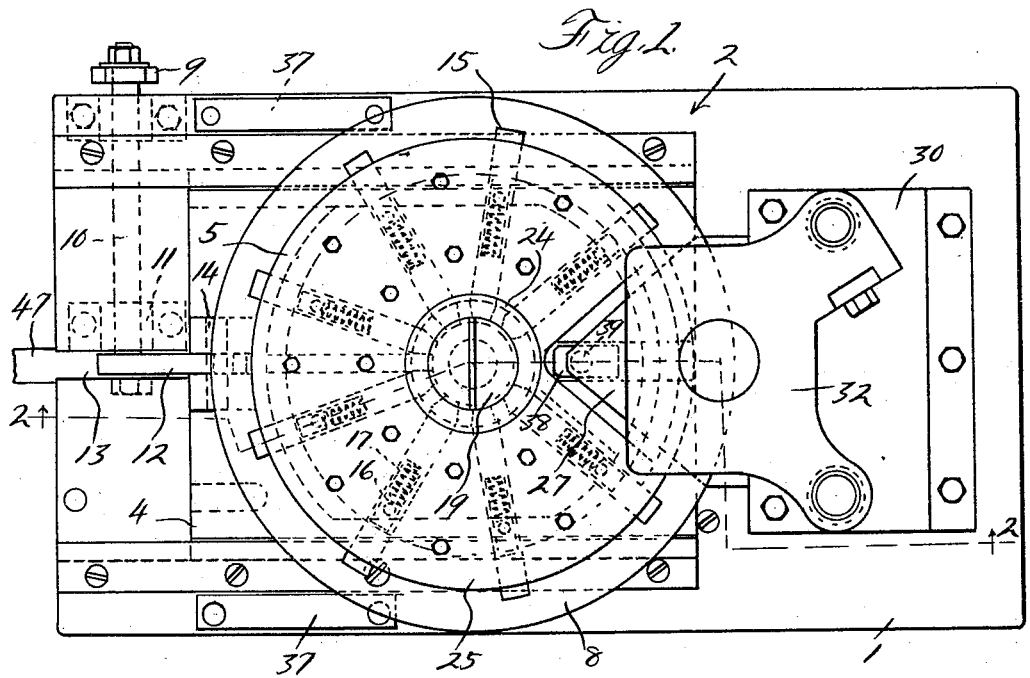
Figure 2 is a cross section on the line 2—2 of Figure 1.
Figure 3:
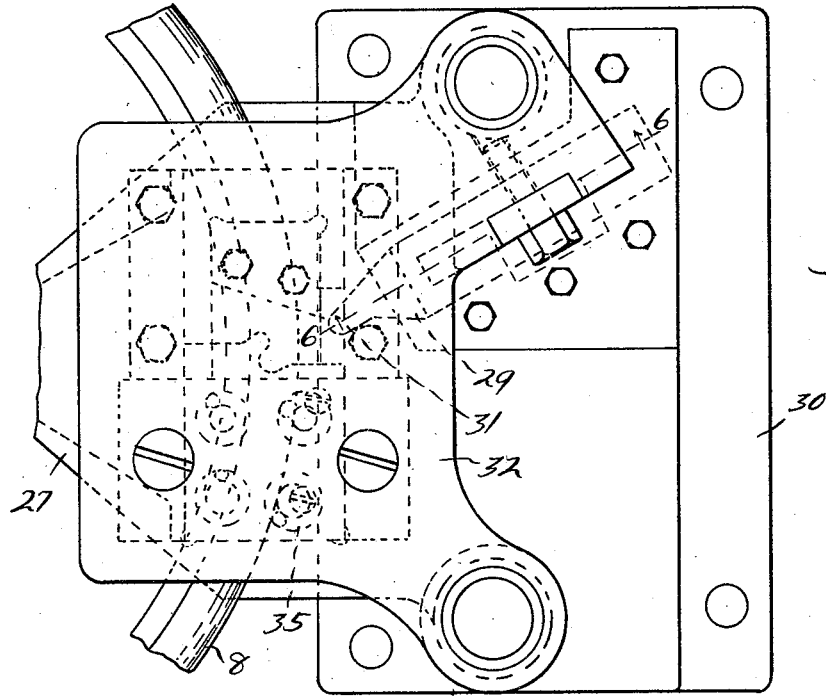
Figure 3 is an enlarged plan view of a portion of the machine.
Figure 2:
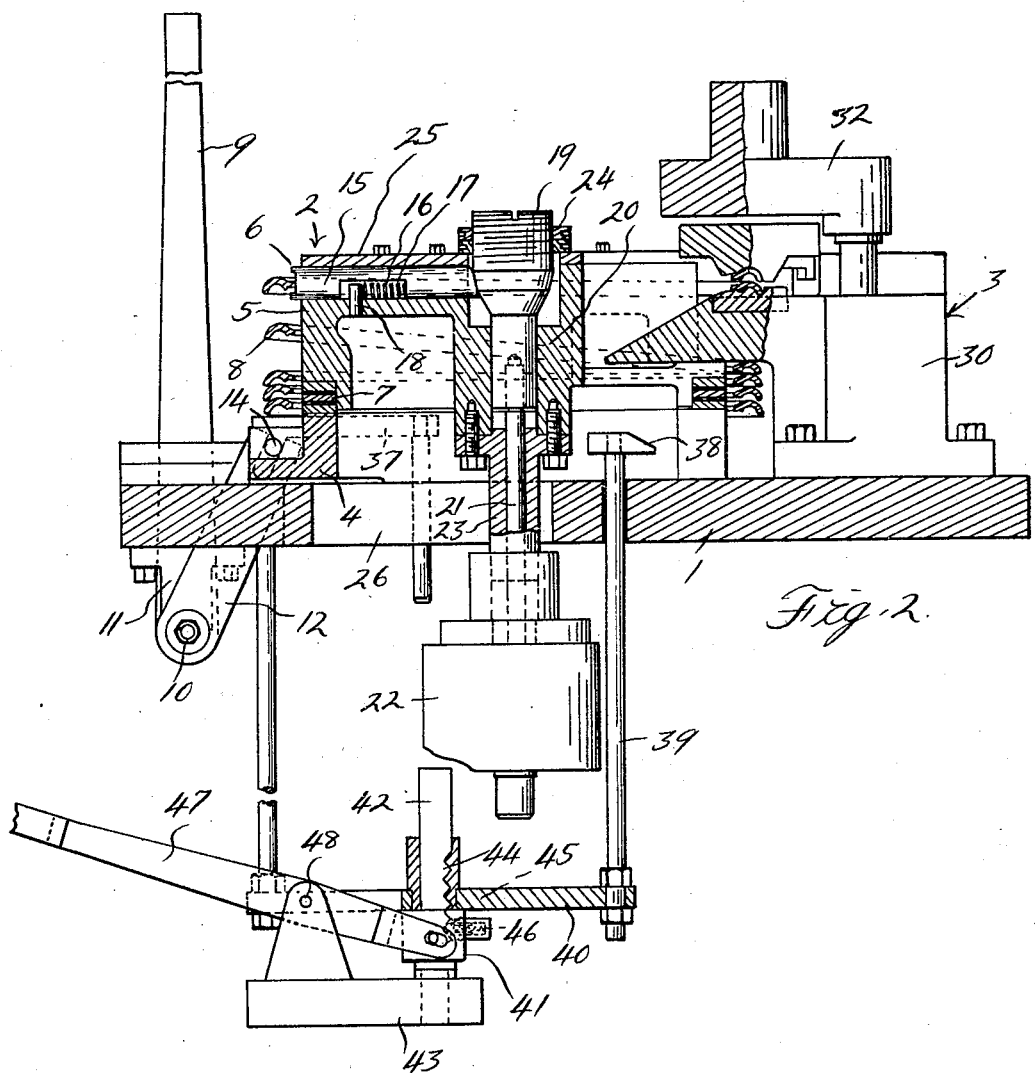
Figure 6:
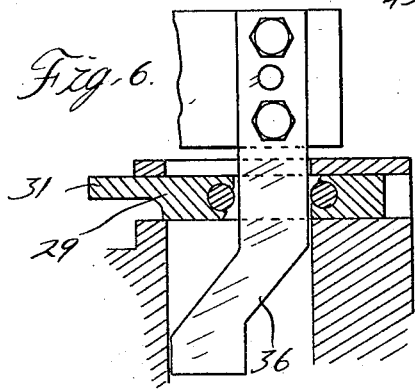
Figure 6 is a cross section on the line 6—6 of Figure 3.

As shown in the present instance, the machine is designed for use in the manufacture of split side rings for tire carrying rims of the solid base type and operates upon a coiled metallic strip having the section of the split side ring. One method of forming the rings with the machine illustrated herein is described in my copending application, Serial No. 272,167, filed April 23, 1928.

The machine has the bolster plate 1 upon which is slidably mounted the device 2 and fixedly mounted the device 3. The device 2 is reciprocable toward and away from the device 3 and comprises the slide 4, the circular body 5 and the sizing means 6. The body 5 is carried upon the slide 4 by the thrust bearing 7 and is adapted to loosely engage within the metallic coiled strip 8 which is to be operated upon. The arrangement is such that the body 5 in effect forms a holder for the coiled strip to move the latter toward and away from the device 3. For reciprocating the slide 4 I have provided the handle 9 which is secured to the shaft 10 and extends upwardly thereabove at one side of the bolster plate. The shaft 10 extends transversely beneath the bolster plate and is mounted in the bearings 11 and has fixedly secured to its inner end the arm 12 which extends upwardly through the slot 13 extending longitudinally centrally of the front end of the bolster plate. The upper end of the arm 12 is bifurcated to embrace the pin 14 which is secured to the front end of the slide 4.

The sizing means 6 is formed of the jaws 15 which are mounted at the upper end of the body 5 to be radially movable relative to this body. These jaws 15 are normally held in their radially inward positions by means of the coil springs 16 located in recesses 17 in the bottoms of the jaws and abutting the inner ends of these recesses and the pins 18, which latter extend upwardly from the body. The jaws are moved radially outward by means of the plunger 19 which extends downwardly through the hub 20 of the body 5 and is secured to the piston rod 21. This piston rod is connected to a piston within the air cylinder 22, the latter being carried from the hub 20 by means of the tubular support 23. Outward radial movement of the jaws 15 is limited by means of the collars 24 threaded upon the plunger and adapted to abut the cover plate 25, which latter is secured to the body 5 and extends over the jaws. The portion of the plunger engaging the inner ends of the jaws is tapered so that by rotatively adjusting the collars 24 upon the plunger the amount of radial outward movement of the jaws may be varied. The bolster plate 1 is provided with the longitudinally extending slot 26 through which the tubular support 23 extends so that reciprocal movement of the device 2 may be freely accomplished.

The device 3 comprises the wedge-shaped separating member 27 and the die 28, both of which are stationary. The wedge-shaped member 27 is adapted to engage between adjacent convolutions of the coiled strip 8 upon movement of the device 2 toward the device 3 to axially separate one convolution from the remaining convolutions. This wedge-shaped member is so positioned that it axially separates the uppermost convolution and raises the same to a position to be engaged by the jaws 15 and the die 28 is so positioned that it will engage and support this separated convolution after the latter has been sized by radial outward movement of the jaws 15. The device 3 also comprises the positioning finger 29 which is reciprocably mounted upon the body 30 of the device and has the nose 31 which is engageable with the uppermost end of the coiled strip to position this end prior to severing of the separated and sized convolution, the positioning being relative to the die 28.

For severing the separated and sized convolution, I have provided the punch holder 32 which may be secured to a ram of a suitable punch press. This punch holder is vertically movable and carries the punch 33 which cooperates with the die 28 to shear the separated and sized convolution from the remaining convolutions. The punch holder also carries the clamping and stripping block 34 which is engageable with the separated and sized convolution to firmly clamp the same to the die 28 prior to engagement of the punch with this convolution. As shown, this clamping and stripping block is yieldably forced downwardly and away from the punch holder as by means of the coil spring 35 which may be compressed upon downward movement of the punch holder and after the clamping and stripping block has engaged the separated and sized convolution to permit the punch to engage the same. The punch holder further carries the cam 36 which extends downwardly through the positioning finger 29 and is adapted to reciprocate this finger into and out of engagement with the uppermost end of the coiled strip upon vertical reciprocation of the punch holder. The cam is so shaped that when the punch holder is in its uppermost position the positioning finger is forced outwardly to engage the uppermost end of the coiled strip. During the downward movement of the punch holder the cam withdraws the positioning finger, preferably just after the clamping and stripping block has engaged the separated and sized convolution and at the same time sufficiently in advance of the punch so that the latter is not interfered with.

For raising the coiled strip so that its uppermost convolutions may be successively separated from those below, I have provided the pair of rest blocks 37 and the single rest block 38, the pair being located at the sides of the bolster plate and extending longitudinally thereabove near its front end to engage the lowermost convolution of the coiled strip at all times. The single rest block, however, is located below the front end of the wedge-shaped separating member 27 so that when the holder is advanced toward this member and the coiled strip is advanced therewith the coiled strip becomes disengaged from the single rest block. These rest blocks are supported upon the rods 39, which extend downwardly through the bolster plate and are connected to the supporting spider 40, the latter resting at its hub upon the collar 41, which is sleeved upon the guide pin 42. This guide pin extends upwardly from the base 43 and is provided with the series of notches 44, which are alternatively engageable by the plunger 45 upon the collar and yieldably forced inwardly by the spring 46. 47 is a foot lever pivoted at 48 upon the base 43 and pivotally connected at its inner end to the collar 41 for raising the collar to engage the spring pressed plunger with the successive notches. These notches being spaced apart a distance corresponding to the thickness of the stock forming the coiled strip, it will be seen that the coiled strip may be raised one convolution at a time.

In operation, a pre-rolled coiled strip is placed over the body 5 when the latter is in a position removed from the device 3. This strip is supported upon the rest blocks 37 and 38 when the latter are in their lowermost position. The device 2 is then advanced toward the device 3 through the lever 9 and carries the coiled strip into engagement with the wedge-shaped separating member 27, which raises the uppermost convolution of the coiled strip to a position registering with the jaws 15. These jaws are then forced radially outward by allowing compressed air or another suitable medium into the cylinder 22 and the uppermost convolution is sized. The body 5 may be then rotated to bring the uppermost end of the coiled strip into contact with the nose 31 of the positioning finger 29, this end being arc shaped in continuation of the remaining portion of the convolution. The punch holder 32 at this time is in its uppermost position and the next step consists in lowering this punch holder to engage the clamping and stripping block 34 with the upper convolution and hold the same against the die 28, after which the positioning finger 29 is withdrawn by the cam 36 and the punch 33 subsequently comes into contact with the upper convolution and cooperates with the die to shear this convolution. The punch holder is then raised and the device 2 separated from the device 3, after which the severed convolution is removed from the machine. The rest blocks 37 and 38 are then raised to their next upper position through the foot lever 47, after which the device 2 is advanced toward the device 3 and the same series of steps carried out again. If the uppermost end of the coiled strip is flat or does not have the same curvature as the rest of the coiled strip, it is apparent that this flat may be removed by the punch 33 so that the uppermost end brought into contact with the positioning finger may be true. With this machine the completed side rings are circular and to correct size so that after they have been removed from this machine no further fashioning or finishing operations are necessary, with the exception of those required for the particular side ring being made. As a result, the side rings, in addition to being accurate and true, may have a neat and pleasing appearance.

What I claim as my invention is:

1. In a machine of the character described, the combination with means for normally supporting a coiled strip having a plurality of convolutions, of means for sizing a convolution of the coiled strip, and means for severing the sized convolution.

2. In a machine of the character described. the combination with means for normally supporting a coiled strip, of means for sizing a convolution of the coiled strip, and means movable parallel to the axis of the coiled strip and engageable with the sized convolution for severing the same.

3. In a machine of the character described, the combination with means for normally supporting a coiled strip, of means for separating a single convolution only of the coiled strip from the remaining convolutions, and means for severing the single separated convolution.

4. In a machine of the character described, the combination with means for normally supporting a coiled strip, of means for separating a convolution of the coiled strip from the remaining convolutions, means for sizing the separated convolution, and means for severing the sized convolution.

5. In a machine of the character described, the combination with means for normally supporting a coiled strip having laterally adjacent convolutions, of means for separating in an axial direction a single convolution only of the coiled strip from the remaining convolutions, and means movable axially for severing the single separated convolution.

6. In a machine of the character described, the combination with means for normally supporting a coiled strip having laterally adjacent convolutions, of means for separating in an axial direction a convolution of the coiled strip from the remaining convolutions, means movable radially of the separated convolution for sizing the same, and means movable axially of the coiled strip for separating the sized convolution.

7. In a machine of the character described, the combination with means for normally supporting a coiled strip, of means extending radially of the convolutions of the coiled strip and engageable between adjacent convolutions for separating one convolution only from the others, and means for severing the separated convolution.

8. In a machine of the character described, the combination with means for normally supporting a coiled strip, of means for separating a convolution of the coiled strip from the remaining convolutions, means for severing the separated convolution, and means for positioning the separated convolution relative to the severing means prior to operation of the latter.

9. In a machine of the character described, the combination with means for normally supporting a coiled strip, of means for separating a convolution of the coiled strip from the remaining convolutions, means for positioning an end of the separated convolution, means for sizing the separated convolution with one end in position, and means for severing the separated convolution.

10. In a machine of the character described, the combination of cooperating relatively movable devices, one device including means for freely engaging a coiled strip and the other device including means engageable between adjacent convolutions of the coiled strip for separating one convolution only from the remaining convolutions, and means movable relative to the separating means for severing the separated convolution.

11. In a machine of the character described, the combination of relatively movable devices, one device including means for freely engaging a coiled strip and means movable relative to said engaging means for sizing a convolution of the coiled strip and the other device including means engageable between adjacent convolutions of the coiled strip for separating one convolution from the others and positioning the separated convolution to be engageable by said sizing means, and means movable relative to said separating means for severing the separated and sized convolution.

12. In a machine of the character described, the combination with means for freely engaging within a coiled strip, of means for engaging between adjacent convolutions of the coiled strip to separate one convolution from the remaining convolutions, means for severing the separated convolution, and means adjustable relative to said separating means for advancing the coiled strip so that said separating means may separate successive convolutions.

13. In a machine of the character described, the combination with a holder freely engaging within a coiled strip and means for reciprocating said holder in a direction transverse to its axis and thereby reciprocating the coiled strip in a direction transverse to its axis, of stationary means engageable between adjacent convolutions of the coiled strip upon the advancement of said holder toward said stationary means for separating one convolution from the remaining convolutions, and means movable in a direction parallel to the axes of said holder and the coiled strip for severing the separated convolution.

14. In a machine of the character described, the combination with a circular holder freely engaging within a coiled strip and means for reciprocating said holder in a direction transverse to its axis, of means carried by said holder and movable radially thereof for sizing a convolution of the coiled strip, stationary means engageable between adjacent convolutions of the coiled strip during the reciprocation of said holder to separate one convolution from the remaining convolutions and position the separated convolution to be engaged by said sizing means, and means movable relative to said separating means for severing the separated and sized convolution.

15. In a machine of the character described, the combination with a reciprocable vertically extending holder for a coiled strip having a vertical axis, of means carried by said holder and movable radially thereof to size a convolution of the coiled strip, a stationary wedge-shaped member engageable between adjacent convolutions of the coiled strip to separate one from the others and to position the separated convolution to be engaged by said sizing means, a stationary die adapted to be engaged by the separated and sized convolution, a vertically movable punch cooperating with said die for severing the separated convolution, and vertically movable means for raising the coiled strip to bring successive convolutions thereof into engagement with said separating means upon successive movements of said holder toward said separating means.

16. In a machine of the character described, the combination with means for supporting a coiled strip, of means for separating a convolution of the coiled strip from the remaining convolutions, and means for sizing the separated convolution.

17. In a machine of the character described, the combination with means for normally supporting a coiled strip having laterally adjacent convolutions, of means for separating in an axial direction a convolution of the coiled strip from the remaining convolutions, and means movable radially for sizing the separated convolution.

18. In a machine of the character described, the combination with means for normally supporting a coiled strip, of means for rotating said coiled strip, means engageable with an end of the coiled strip to position the same, and means for sizing a convolution of the coiled strip when the latter is in position.

19. In a machine of the character described, the combination with a reciprocable vertically extending holder for a coiled strip having a vertical axis, of means for reciprocating said holder, means operable upon reciprocation of said holder for engaging between adjacent convolutions of the coiled strip to separate one from the others, and vertical movable means for raising the coiled strip to bring successive convolutions thereof into engagement with said separating means upon movement of the holder toward said separating means.

In testimony whereof I affix my signature.
WILLIAM N. BOOTH.